United States Patent [19]
Colbourne et al.

[11] Patent Number: 5,915,063
[45] Date of Patent: Jun. 22, 1999

[54] VARIABLE OPTICAL ATTENUATOR

[76] Inventors: Paul Colbourne, 45D Woodfield Drive, Nepean, Ontario, Canada, K2G 3Y6; Jasvinder Obhi, 28 Daventry Crescent, Nepean, Ontario, Canada, K2J 4N6; Neil Teitelbaum, 834 Colonel By Drive, Ottawa, Ontario, Canada, K1S 5C4

[21] Appl. No.: 08/880,393

[22] Filed: Jun. 23, 1997

Related U.S. Application Data

[63] Continuation-in-part of application No. 08/784,106, Jan. 15, 1997, abandoned.

[51] Int. Cl.[6] .................................................. G02B 6/26
[52] U.S. Cl. .............................................................. 385/140
[58] Field of Search ................................. 385/18, 23, 25, 385/140

[56] References Cited

U.S. PATENT DOCUMENTS

| | | | |
|---|---|---|---|
| 4,516,827 | 5/1985 | Lance et al. | 385/140 |
| 5,185,675 | 2/1993 | Banks | 359/181 |
| 5,208,880 | 5/1993 | Riza et al. | 385/16 |
| 5,226,104 | 7/1993 | Unterleitner et al. | 385/140 |
| 5,245,463 | 9/1993 | Goto | 359/214 |
| 5,245,464 | 9/1993 | Jensen | 359/224 |
| 5,550,669 | 8/1996 | Patel | 359/224 |
| 5,600,478 | 2/1997 | Stevens | 359/223 |

*Primary Examiner*—Hung N. Ngo
*Attorney, Agent, or Firm*—Neil Teitelbaum & Associates

[57] ABSTRACT

A variable, hybrid optical attenuator has a flexure member which consists of a bridge portion joining two prongs which are flexibly movable relative to the bridge portion. A mirror is mounted on the bridge portion. The prongs are each connected to an actuator which can expand or contract in response to a control signal applied thereto. The control signal may be heat, an electric field, a magnetic field or, preferably, a combination thereof. The attenuator is positioned opposite a pair of optical waveguides so that an input optical signal from an input waveguide is incident on the mirror and, upon reflection, is received by the second waveguide. Attenuation of the transmission is effected by controlled tilting of the mirror caused by appropriate control signals, single or in combination, applied to one or both of the actuators.

8 Claims, 3 Drawing Sheets

VARIABLE OPTICAL ATTENUATOR

This application is a continuation-in-part of U.S. patent application Ser. No. 08/784,106 filed Jan. 15, 1997, now abandoned.

FIELD OF THE INVENTION

This invention relates to optical signal attenuators, and more particularly to optical variable attenuators employed in fiber-optic transmission systems, of the kind which allow an optical signal to be transmitted from an input waveguide to an output waveguide wherein the efficiency of the transmission is controlled.

BACKGROUND OF THE INVENTION

It is often necessary to couple the output of one or more optical fibers into one or more other optical fibers. This function is performed by switches or attenuators. The latter are designed to control, usually steplessly, the coupling efficiency. Many attenuator designs are already known; in some instances, a switch may be adapted to function as an attenuator and vice versa.

With the prevailing present trend toward miniaturization of optical transmission components, simple but reliable attenuating couplers that lend themselves to a size reduction are obviously at a premium. This cannot be said of many presently known proposals.

U.S. Pat. No. 5,226,104 to Unterleitner et al. describes an optical fiber coupler having an attenuating plate inserted between a fiber holder portion of the device and a reflecting mirror. The fixed mirror performs a coupling function only.

U.S. Pat. No. 5,208,880 to Riza et al. proposes a microdynamical fiber-optic switch which includes a piezoelectric actuator and a mirror coupled to the actuator. Governed by a controllable voltage source, the actuator displaces the mirror along a linear path such that an incident light is reflected from the mirror and deflected into a selected output connection port.

U.S. Pat. No. 5,185,675 to Banks describes an electro optic modulator for fiber optic transmission, the modulator having an elongated piezoelectric member which changes length when an electric field is imposed across it. A mirror is attached to a free-end of the piezoelectric member and strains or alternatively moves toward and away from a partially reflecting surface at the end of an adjacent optical fiber.

Other optical coupling systems are known e.g. from U.S. Pat. Nos. 5,133,030; 4,303,302; 4,950,884; and 4,924,870.

It is an object of the invention to provide a simple and reliable attenuating coupler for an optical transmission system, the coupler having a minimal number of components and thus amenable to miniaturization.

It is another object of the invention to provide a device as defined above having a minimal number of mechanical connections subject to wear with concomitant loss of accuracy.

SUMMARY OF THE INVENTION

According to the invention, an optical attenuating device is provided for controllably coupling optical energy between at least one pair of optical waveguides. The device comprises a reflective surface, or mirror, for receiving and reflecting an incident optical signal beam, and at least one actuator means operatively connected with said reflective surface for controlling the angular position of said reflective surface relative to said incident optical signal beam. Control means are provided for controlling the angular position of the reflective surface such that the surface can assume a plurality, greater than two, of positions relative to the incident optical signal beam, the plurality of positions resulting in a corresponding plurality of coupling efficiencies of the incident beam between the input waveguide and an output waveguide. As a consequence of a change of the angular position, the beam reflected from the reflective surface is coupled to a varying degree, or with a varying efficiency, with an output waveguide.

Of course, there may be more than one output waveguide and the purpose of the invention is still accomplished as long as the incident beam is coupled to one or more of the output waveguides with variable efficiency.

The reflective surface may be flat or concave.

As defined for the purposes of the present invention, the actuator has an element which changes its dimension or dimensions in response to a control signal applied thereto, the control signal exemplified by heat, an electric field or a magnetic field. The actuator may also change its dimension or dimensions as a result of two or more control signals applied simultaneously or consecutively. The actuator may be e.g. an element which changes at least one of its dimensions in response to heat, or it may comprise a piezoelectric member, a magnetostrictive member or an electrostrictive member, wherein the control signal is a magnetic field or an electric field.

In an embodiment of the invention, the actuator comprises a thermally expansible member, e.g. a metallic member, and a heating element associated with the member for applying heat and thus imparting temperature changes to the member. The metallic member may be coupled with another member, e.g. a piezoelectric, or a magnetostrictive member, the other member being associated with corresponding means for controlling the elongation thereof.

Where a thermally expansible member with heating means is employed, it is preferable to provide thermal insulation between the member and the adjacent structural elements of the attenuator e.g. the base in order to minimize the heat transfer from the thermally expansible member to the adjacent structural elements.

It is commonly known that piezoelectric elements, while having a relatively short response time compared to thermal expansion, are usually subject to hysteresis. The latter is a drawback as it impairs the reliability and repetitiveness of the operation of the attenuator.

Furthermore, the material of the electrodes tends to migrate into the piezoelectric material, particularly as a result of sustained voltage. This migration, known as "silver migration", can give rise to short-circuiting in the piezoelectric member.

On the other hand, metals do not suffer from noticeable hysteresis when subjected to thermal expansion, but the response time of the expansion is markedly longer than the response time of the piezoelectric, electrostrictive or magnetostrictive elements. Therefore, where both high reliability and low response time are desired, a hybrid attenuator design, as illustrated and described below, may be employed. The hybrid actuator combines a heat-responsive member with associated heat control means, and a second member having a shorter response time to a control signal than the heat-responsive member.

The device may comprise a flexure member, or flexure hinge, associated with said reflective surface and said actuator for converting a dimensional change of the actuator into an angular displacement of the mirror.

Preferably, the device may comprise two separate actuators disposed such as to provide compensation for the effect of ambient conditions (temperature, humidity) or other factors on a single actuator.

The device of the invention may be installed in a proper position relative to an optical waveguide or a pair of optical waveguides. Alternatively, the device may encompass at least one end portion of an optical waveguide for admitting the incident optical signal beam. To enhance the focusing of the optical signal beam, an optical element, e.g. a lens, may be disposed between the end face or faces of the optical waveguides and the mirror. Alternatively, a mode-field expanding fiber or fibers may be used to eliminate the need for the optical focusing element.

The angular position of the reflective surface may be controlled such that the reflected beam is directed towards the same (bi-directional) waveguide or towards the end portion of another optical waveguide.

DETAILED DESCRIPTION AND BEST MODE OF THE INVENTION

Figure 1:
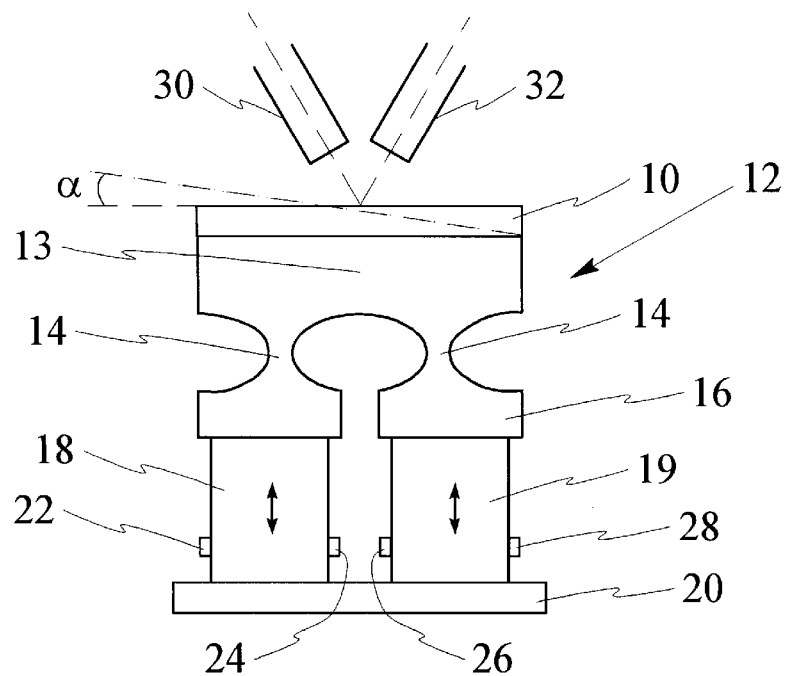
FIG. 1 is a schematic side view of an exemplary embodiment of the attenuating device.

Turning first to FIG. 1, an exemplary attenuator has a planar mirror 10 which is mounted on a flexural member 12. The member 12 has a rigid bridge portion 13 and two rigid prongs or legs 16 connected to the bridge portion 13 through relatively flexible gooseneck portions 14. The flexibility of the gooseneck portions 14 should be sufficient to transmit a longitudinal displacement of the actuators 18, 19 (illustrated by the vertical arrows) onto a tilting motion of the mirror 10 as illustrated by the angle α (alpha). A piezoelectric member 18, 19 is attached rigidly to each of the prongs 16. Alternatively, the members 18, 19 may be magnetostrictive or electrostrictive elements. The members 18, 19 are mounted rigidly to a reference base 20 so that any movement of the members, other than a longitudinal expansion or contraction caused by voltage signals or thermal deformation, is prevented.

Electrodes 22, 24, 26, 28 are mounted to both members respectively to supply a voltage signal from a variable voltage source 29, not illustrated. If the members 18 and 19 are magnetostrictive elements, the electric voltage source 29 is replaced with a suitable source of magnetic field.

The polarity of the electrodes is not indicated to emphasize the possibility of applying either similar or reverse polarity to the piezoelectric members 18, 19. In the former case, the operation of the device would be based on a difference in the voltage applied to the respective actuators 18, 19. In the latter case, due to opposite strain of the actuators, a significantly enhanced lever effect and thus an enhanced attenuation range can be attained.

It is of course possible to employ another known type of joint, or hinge, between the actuators and the mirror to perform the above-defined tilting function. The advantage of a flexure hinge over a conventional hinge or joint is the absence of a mechanical connection which is subject to wear and resulting decrease in accuracy.

Light is directed onto the mirror 10 through a first optical fiber 30 which is positioned at an angle to the surface of the mirror 10. The second optical fiber 32 is positioned to receive at least a part of the light reflected from the mirror 10.

As explained hereinbelow, the device can function with only one piezoelectric (electrostrictive, magnetostrictive) member 18. The flexure member 12 can be replaced with any pivoting structure carrying the mirror 10 thereon, wherein the longitudinal displacement of the member 18 would be transmitted into a pivoting movement of the mirror 10. However, it is advantageous to employ two members in parallel to provide a compensation of ambient conditions (typically thermal expansion). Additionally, the use of two piezoelectric etc. members with reversed polarities of the signal voltage, gives an additional advantage of enhanced mirror tilting (angular displacement) effect, hence increased attenuation range.

The size, mainly length, of the piezoelectric member or members, as well as the relative size of the flexure member, should be selected to impart a desired angular motion of the mirror, combined if desirable by the opposite action of the members. It is well known to those skilled in the art that the actual size of a single piezoelectric element may be in the order of a few hundred microns and less.

In operation of the embodiment of FIG. 1, a signal voltage is applied to the positive and negative electrodes of both piezoelectric members 18, 19. The voltage is different for the separate actuators. As a result, one of the members undergoes a different change in size (contraction or expansion) than the other member. As the members are mounted rigidly to the reference frame 20 with their first ends (lower ends in the drawing), the different strain caused by the respective voltages causes a non-symmetric action of their distal (upper) ends onto the prongs of the flexural member 12 which acts as a double hinge. The non-symmetric action causes a flexure of the gooseneck portions 14, and ultimately causes the mirror 10 to tilt, thus providing an angular displacement of the mirror (reflective surface) relative to the direction of the light beam supplied from the first optical fiber 30. If the mirror is initially adjusted for a minimum attenuation of the light beam, as illustrated e.g. in FIG. 1, the tilt causes the reflected beam to deviate from its initial direction. The deviation is controlled, through the magnitude of the voltage signal, to effect a partial misalignment of the reflected beam relative to the axis of the second optical fiber 28, the misalignment resulting in a related attenuation of the input optical signal.

Figure 2:
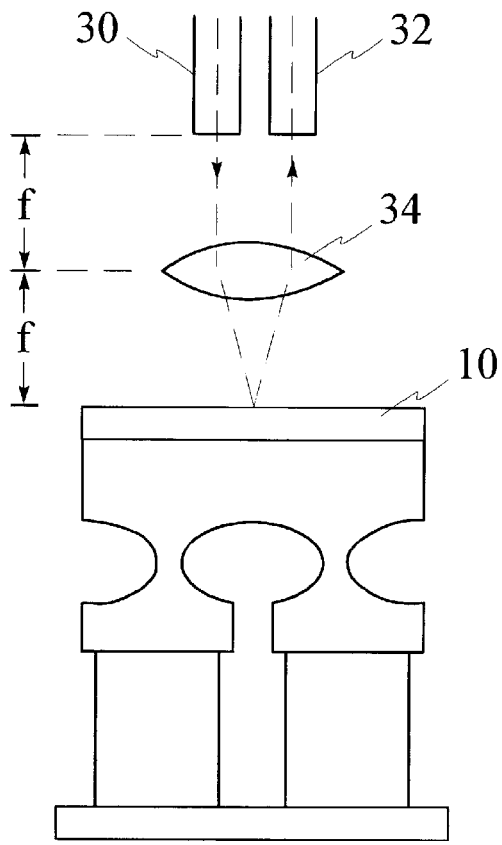
FIG. 2 is a schematic view of another embodiment, employing an optical lens.
Figure 3:
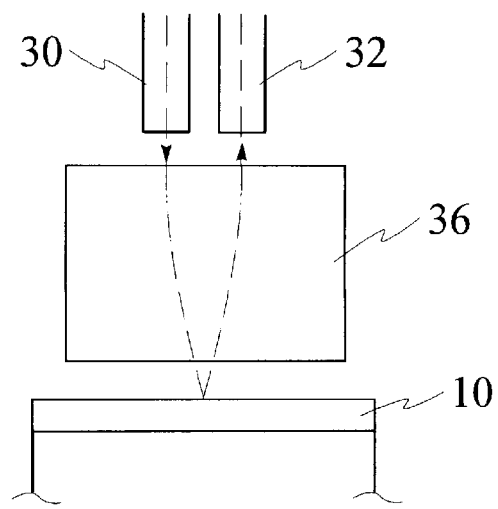
FIG. 3 is a schematic view of an embodiment employing a GRIN lens.

While the mirror 10 is illustrated in FIGS. 1, 2 and 3 as a flat mirror, it may also be concave to facilitate focusing of the reflected beam.

It is possible to use only one piezoelectric element while the other element is not activated and functions as part of the reference frame, or is replaced by a fixed member. When the single piezoelectric member is energized, the mirror is tilted because of a difference in length between the two supports each including respectively a piezoelectric member and the prong attached thereto.

It is known that light exiting from a "unlensed" normal core optical fiber end face, and especially a small diameter core optical fiber end face, will diverge, or "fan out". The problem is particularly acute in the case of so-called single or mono-mode fibers in which the mode field diameter (effective size of the core) is only about 5 to 15 microns. The divergence of light from a single-mode fiber with a larger core is smaller than from a single-mode fiber with a smaller core.

In the embodiment illustrated in FIG. 1, the divergence of light exiting a normal fiber would render the arrangement of little use as only a small fraction of the reflected beam would hit the output fiber.

If a collimated light beam is required e.g. to couple a signal between two adjacent fibers, optical devices e.g. lenses are typically required. However, lenses occupy additional space which is at a premium as mentioned herein. The cost of a lens may also be a factor.

Therefore, the "lensless" embodiment of FIG. 1 employs mode field expanded fibers, i.e. optical fibers of the type which has a core the physical diameter of which, or the mode field diameter (MFD) of which, expands towards the end of the fiber. The latter fibers are disclosed in a reference entitled "Beam Expanding Fiber Using Thermal Diffusion Of The Dopant" in Journal of Lightwave Technology, Vol. 8, No. 8, August 1990. The beam expanding fiber of the above reference has a core whose index of refraction is determined by the dopant, e.g. Ge, that is thermally diffused so that a spot size of the fundamental mode, which corresponds to the mode-field diameter of the optical fiber, is partially expanded. Fibers produced by such methods are known as "thermally-diffused expanded core" or TEC fibers.

The general term "mode-field expanded fiber" as used herein denotes both TEC fibers and fibers in which the core diameter is expanding towards the end of the fiber. In 11 the embodiments of the invention, the fibers 30 and 32 can be of either type.

As shown in FIG. 2, the input fiber 30 and the output fiber 32 may be positioned in parallel when an optical lens 34 is placed between the ends of the fibers 30,32 and the mirror 10, spaced therefrom by one focal length f. The lens 34 focuses the optical signal from the input fiber 30 on the mirror 10 and thus improves the control of the reflected beam. The fibers 30, 32 may be standard fibers or, optionally, may be mode-field expanded fibers.

The optical lens 34 may be replaced by a graded index (GRIN) lens 36, as seen in FIG. 3. The advantage of this design is similar as with the embodiment of FIG. 2, except that the use of a GRIN lens does not necessitate an adjustment of the focal distance.

When two actuators 18, 19 are used, they may be controlled by separate variable voltage sources, not shown in the drawings. Alternatively, both actuators may be controlled using a single supply system shown in FIG. 4. In this system, the $V^+$ and $V^-$ are the supply voltages while the $V_{control}$ varies between these limits to effect variable attenuation of the light signal reflected from the mirror 10.

Figure 4:
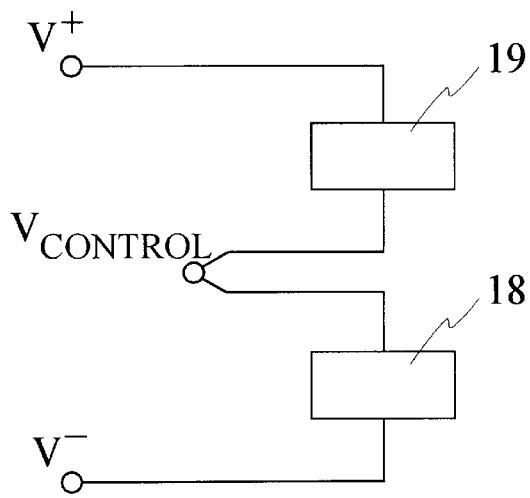
FIG. 4 is a schematic representation of an exemplary electrical diagram of the device.
Figure 5:
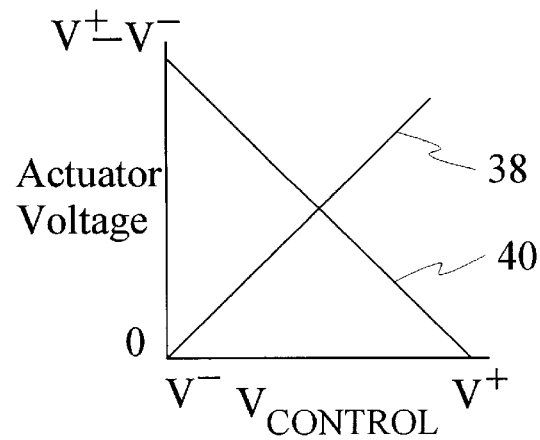
FIG. 5 is a graph illustrating the relationship between supply and control voltage in the embodiment of FIG. 4.

FIG. 5 explains graphically the relationship between the supply voltage and control voltage in the system of FIG. 4. It will be seen that the control voltage may vary, as indicated above, between the positive and negative limits of the supply voltage. As seen in FIG. 5, when the control voltage approaches $V^+$, the voltage on actuator 18 (line 38) is at the maximum, corresponding to the maximum elongation of the actuator, while the voltage on actuator 19 (line 40) is at the minimum, corresponding to a minimum elongation of the actuator 19. The resulting imbalance in the length of the actuators causes a tilting displacement of the mirror 10 and an attenuation of the reflected light signal admitted from the waveguide end 30.

Figure 6:
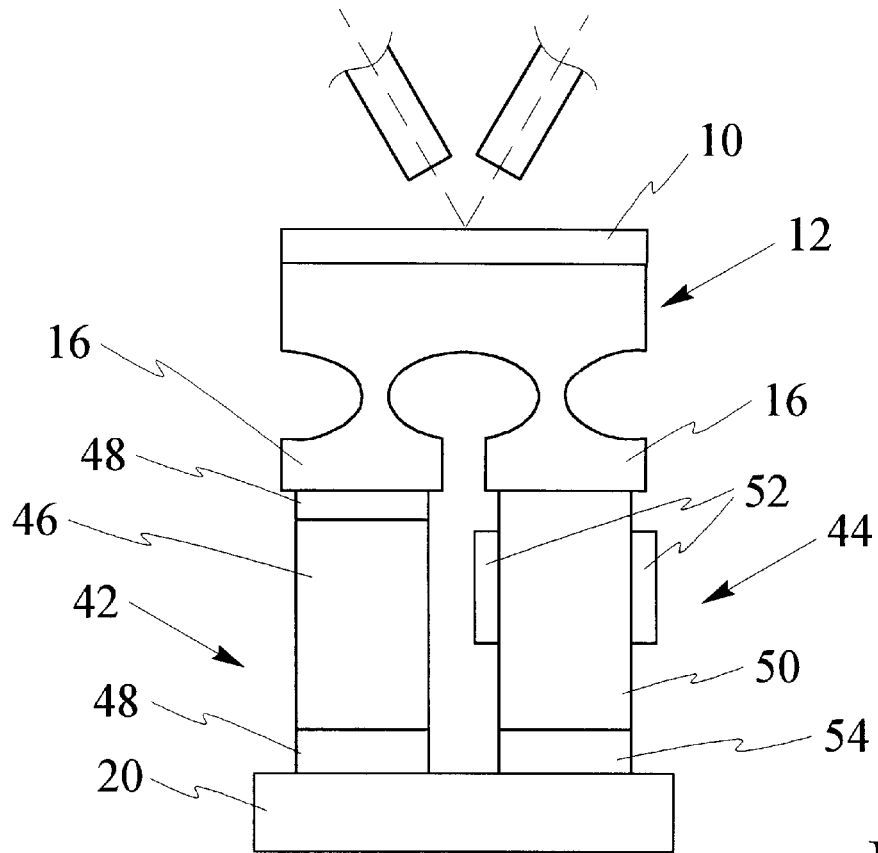
FIG. 6 is a schematic view of an embodiment of the device employing a thermally-expansible actuator.

In an alternative embodiment illustrated in FIG. 6 in which like elements are designated with same numerals as in FIG. 1, the attenuator has two actuator members 42, 44 of which one member 42 has a metallic element 46 which is attached to the left prong 16 and the base 20 by way of two thermal insulators 48 respectively which are embodied by plastic, thermally insulative spacers. The other member 44 has a metallic (preferably aluminum because of its high thermal expansion coefficient) element 50 with two resistive heaters 52 supplied from a variable voltage source 29, shown in FIG. 1. The member 44 is attached directly to the right prong 16 and to the base 20 by way of a plastic thermally insulative spacer 54.

Figure 7:
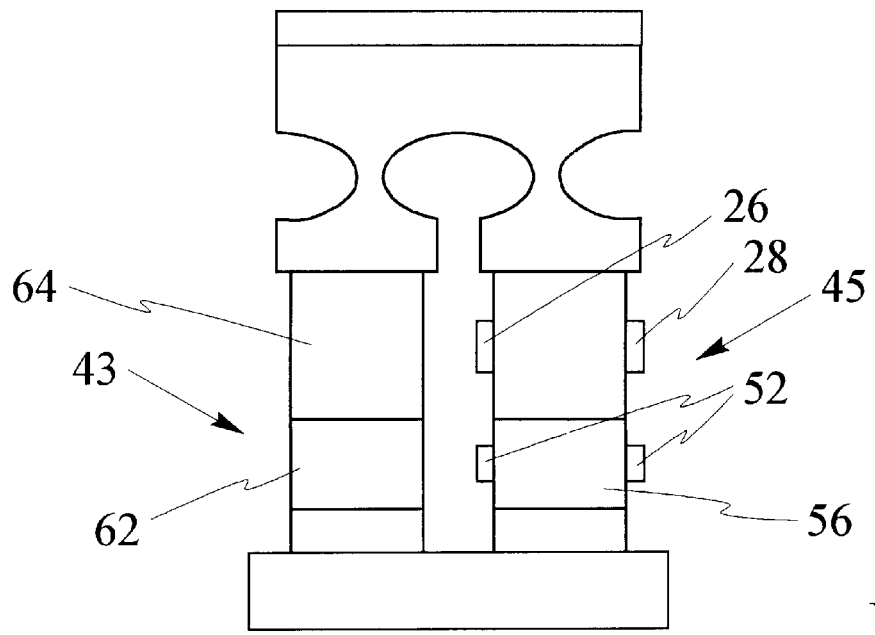
FIG. 7 is a schematic view of a hybrid attenuating device of the invention.

The embodiment illustrated in FIG. 7 differs from the one of FIG. 6 in that the actuator 45 is a hybrid actuator and has a thermally-responsive aluminum element 56 with resistive heaters 52, a piezoelectric member 58 with electrodes 26, 28 and a thermally insulative spacer 60. The actuator 43 as illustrated has an aluminum element 62, a piezoelectric member 64 and a thermally insulative plastic spacer 66. The actuator may optionally have heaters associated with the element 62 and electrodes associated with the piezoelectric member 64, not illustrated. Similarly as in the embodiment of FIG. 1, the polarity of the electrodes in the actuator 43 may be reversed compared to the electrode polarity in the actuator 45 so as to enhance the tilting effect by an oppositely-directed action of the paired actuators.

In operation of the embodiment of FIG. 6, the resistive heaters 52 are activated by applying a controlled voltage and the aluminum element 50 expands, thereby tilting the hinge element 12 and the mirror 10 for an attenuating action. The heat from the heaters 52 is insulated from the base 20 by the spacer 54 and from the other "leg" 42 by the spacers 48. It is also feasible to install a thermal insulator between the member 50 and the adjacent prong 16 so as to limit the heat transfer therebetween.

In operation of the embodiment of FIG. 7, the hybrid actuator 45 may be operated in any sequence. For instance, both the electrodes 26, 28 and the heaters 52 can be activated simultaneously. The piezoelectric element 58 will respond faster. The combined elongation of the thermally extensible element 56 and the piezoelectric member 58 will cause the mirror to tilt.

It is however preferable to minimize the problem of electrode migration and hysteresis of the piezoelectric element, and rely mainly on the more reliable thermally-extensible element of the actuator 45 of FIG. 7. To this end, the electrodes 26, 28 of the piezoelectric member 58 are activated first or simultaneously with the heaters 52 by applying a controlled voltage signal. An initial elongation of the actuator 45 is thus attained relatively quickly. The slower thermal expansion effect causes the actuator 45 to expand further. When a certain level of total expansion of the actuator 45 is attained, as determined by continuous optical feedback, the voltage signal to the electrodes 26, 28 is gradually or rapidly turned off and the total elongation of the actuator 45 becomes a function of the thermal expansion effect only. In this mode of operation, the piezoelectric effect (or, as explained hereinabove, the electrostrictive or magnetostrictive effect correspondingly) is employed as a quick starter of the actuator action. Subsequently, the thermally responsive element "takes over" and the piezoelectric element can be turned off whereby its service life is extended. Using optical feedback, the device can be controlled such that a desired level of attenuation is achieved quickly and then is maintained practically constant due to the compensation of the respective elongations of the two members of the actuator. Of course, the heat-responsive member and the piezoelectric (electrostrictive, magnetostrictive) member have to be adapted, e.g. through the proper arrangement and polarity of the electrodes, to act in the same sense upon activation.

As explained above, this arrangement also improves the reliability of the device, as the final elongation of the actuator is a function only of the thermal expansion which in turn is strictly dependent on the voltage applied to the resistive heaters.

While aluminum is used because of its high coefficient of thermal expansion, it is also possible to use another material, metallic or non-metallic. In the latter case, the material may be a resistive, electrically conductive material. Its expansion would occur upon applying electric current thereto. This would eliminate the need for separate heaters.

The following formulas are provided as the approximate expected attenuation from an attenuator of this type and will be useful in designing/dimensioning the attenuator. The formulas assume Gaussian beams, however the beam profile in an optical fibre is not exactly Gaussian.
With a lens:
Attenuation in [dB]=10 (log e) $(2\alpha f/w)^2 = 4.343(2\alpha f/w)^2$
Without a lens:
Attenuation in [dB]=10 (log e) $[(2\alpha\pi w/\lambda)^2 + (2\alpha f/s)^2]$
Where
  f=lens focal length
  w=fiber mode field radius
  α=mirror tilt angle
  s=separation between mirror and fibers
  λ=wavelength It will occur to those versed in the art that the embodiments discussed and illustrated hereinbelow can be replaced with equivalent designs having more components or a more complex operation. However, it is well known that, typically, the greater the number of components and their connections, the greater the likelihood of wear and tear, with resulting deterioration of the accuracy of control of the device.

What is claimed is:

1. An optical reflective attenuating device for controllably coupling optical energy between an incident optical signal beam and an output optical waveauide, the device comprising:
   a reflective surface disposed for receiving and reflecting an incident optical signal beam,
   at least one actuator operatively connected to said reflective surface for controlling an angular position of said reflective surface relative to said incident optical signal beam, and
   actuator control means for controlling the angular position of said surface in a non-binary manner such that said mirror can assume a plurality, greater than two, of positions relative to said incident beam resulting in a variable coupling efficiency between said incident beam and said output waveguide, the device further comprising
   first and second optical waveguide ends terminating optical waveguides for admitting the incident optical signal beam and receiving an optical signal upon its reflection from said reflective surface.

2. The optical device of claim 1 wherein said optical waveguides are mode-field expanded fibers.

3. The device of claim 1 wherein said optical waveguides are TEC fibers.

4. The device of claim 1 further comprising a lens disposed between said optical waveguide ends and said reflective surface, for focusing said incident optical signal beam on said reflective surface.

5. The device of claim 4 wherein said lens is a graded-index lens.

6. An optical reflective attenuating device for controllably coupling optical energy between an incident optical signal beam and an output optical waveguide, the device comprising:
   a reflective surface disposed for receiving and reflecting an incident optical signal beam,
   at least one actuator operatively connected to said reflective surface for controlling an angular position of said reflective surface relative to said incident optical signal beam,
   actuator control means for controlling the angular position of said surface in a non-binary manner such that said mirror can assume a plurality, greater than two, of positions relative to said incident beam resulting in a variable coupling efficiency between said incident beam and said output waveguide, and further comprising a hinge means connected to said at least one actuator and to said reflective surface and operable to cause a tilting movement of said reflective surface in response to an action of said actuator, said hinge means being a flexural member operatively connected to said reflective surface and to said actuator to convert a dimensional change of said actuator into an angular displacement of said reflective surface, wherein said flexural member has two flexible prongs connected by a rigid bridge portion, said bridge portion having a reflective surface mounted thereto, said actuators each connected to one of said prongs such as to enable a tilting displacement of said reflective surface upon a change of length of at least one of said actuators caused by said control signal.

7. An optical reflective attenuating device for controllably coupling optical energy between an incident optical signal beam and an output optical waveguide, the device comprising:
   a reflective surface disposed for receiving and reflecting an incident optical signal beam,
   at least one actuator operatively connected to said reflective surface for controlling an angular position of said reflective surface relative to said incident optical signal beam, and
   actuator control means for controlling the angular position of said surface in a non-binary manner such that said mirror can assume a plurality, greater than two, of positions relative to said incident beam resulting in a variable coupling efficiency between said incident beam and said output waveguide, wherein said actuator comprises a heat-expansible member,
   the device further comprising a thermal insulation means for reducing heat transfer between said heat-expansible member and an element or elements connected thereto.

8. A method of operating an optical reflective attenuating device having an optical reflective attenuating device for controllably coupling optical energy between an incident optical signal beam and an output optical waveguide, the device comprising:

a reflective surface disposed for receiving and reflecting an incident optical signal beam, at least one actuator operatively connected to said reflective surface for controlling an angular position of said reflective surface relative to said incident optical signal beam, and actuator control means for controlling the angular position of said surface in a non-binary manner such that said mirror can assume a plurality, greater than two, of positions relative to said incident beam resulting in a variable coupling efficiency between said incident beam and said output waveguide, the actuator having a heat-expansible member and a second member having a shorter response time than said heat-expansible member, the method comprising the steps of a) applying a control signal to said second member to effect a predetermined tilting displacement of said reflective surface, b) applying a control signal to said heat-expansible element and c) controllably reducing the control signal to said second member such as to achieve a predetermined tilting displacement of said reflective surface as a result of thermal expansion of said heat-expansible member only.

* * * * *